United States Patent [19]

Beck et al.

[11] Patent Number: 5,159,681

[45] Date of Patent: Oct. 27, 1992

[54] PAGE PRINTER MEMORY ALLOCATION

[75] Inventors: James L. Beck, Versailles; John K. Brown, III; Carl P. Cole, both of Lexington; Wallace L. Holloway, II; Lynn M. Oliver, both of Lexington; Stephen R. Troyer, Lexington, all of Ky.

[73] Assignee: Lexmark International, Inc., Greenwich, Conn.

[21] Appl. No.: 392,492

[22] Filed: Aug. 11, 1989

[51] Int. Cl.$^5$ .............................................. G06F 12/00
[52] U.S. Cl. ...................................... 395/425; 395/400
[58] Field of Search ............... 364/966.4, 970.5, 970.2, 364/970.3, 957.1; 395/400, 425

[56] References Cited

U.S. PATENT DOCUMENTS

| | | | |
|---|---|---|---|
| 4,527,251 | 7/1985 | Nibby et al. | 364/900 |
| 4,860,119 | 8/1989 | Maniwa et al. | 358/296 |
| 4,922,349 | 5/1990 | Abe et al. | 358/443 |

FOREIGN PATENT DOCUMENTS

| | | |
|---|---|---|
| A283157 | 9/1988 | European Pat. Off. |
| A310712 | 4/1989 | European Pat. Off. |
| A311111 | 4/1989 | European Pat. Off. |

OTHER PUBLICATIONS

Ricoh PC Laser 6000 Owner's Manual, Copyright 1986 by Ricoh Company, Ltd., pp. I-17, C1-C2, and C11-C12.

Electronic Design, vol. 36, No. 16, Jul. 14, 1988, Hasbrouck Heights, N, pp. 63-64, B. W. Phillips, entitled "Intelligent VLSI Controllers Give Laser Printing A Boost".

*Primary Examiner*—Joseph E. Clawson, Jr.
*Attorney, Agent, or Firm*—John J. McArdle, Jr.

[57] ABSTRACT

A memory management system for a page printer controller (11) which includes random access memory (17) allocated among bit map memory (30), page buffer memory (29), and user memory (28). The memory management system allocates the random access memory to provide either a large bit map memory or, responsive to needs of the controller (11) for increased memory for other uses, for allocating the random access memory (17) to provide a small bit map memory and place more memory in the page buffer memory (29) and user memory (28).

1 Claim, 9 Drawing Sheets

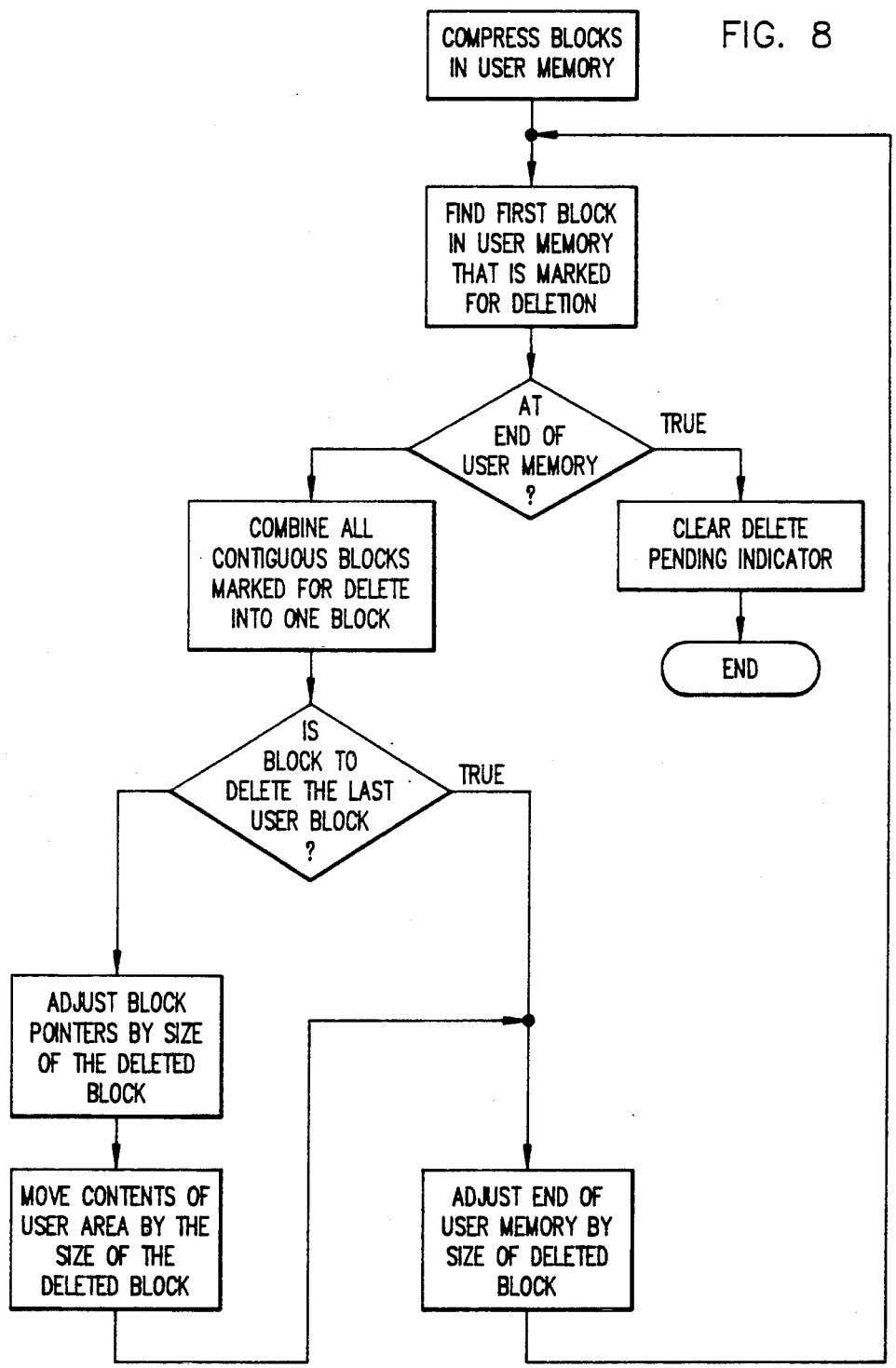

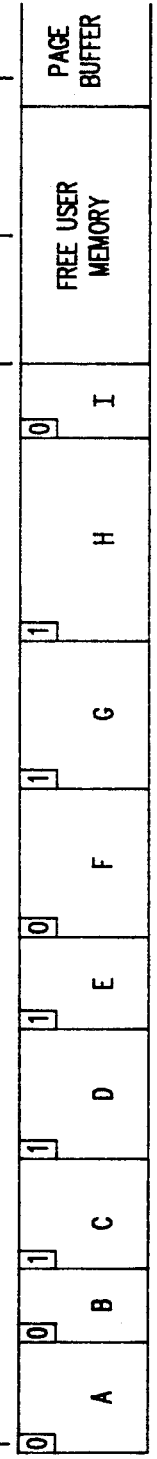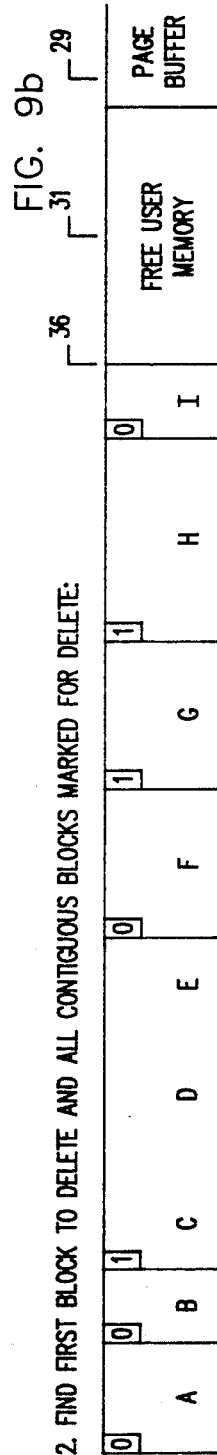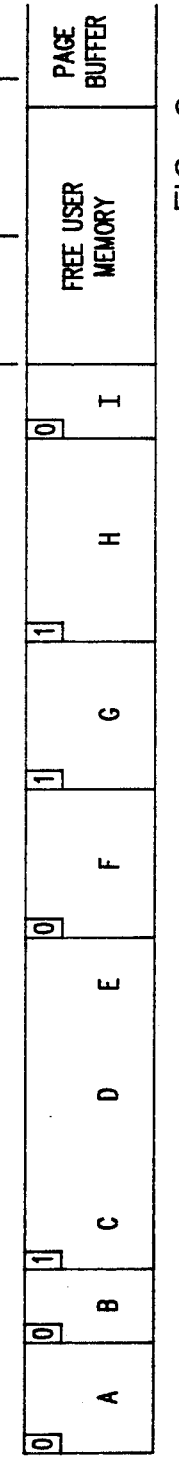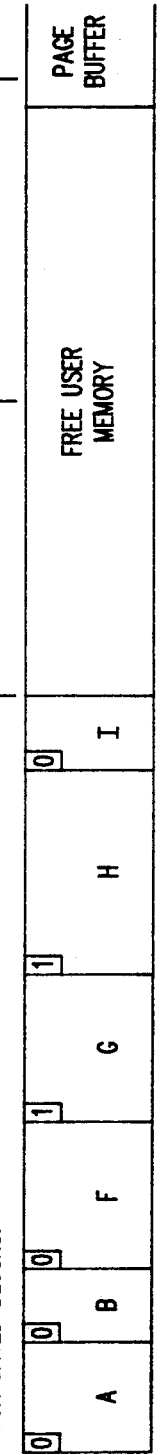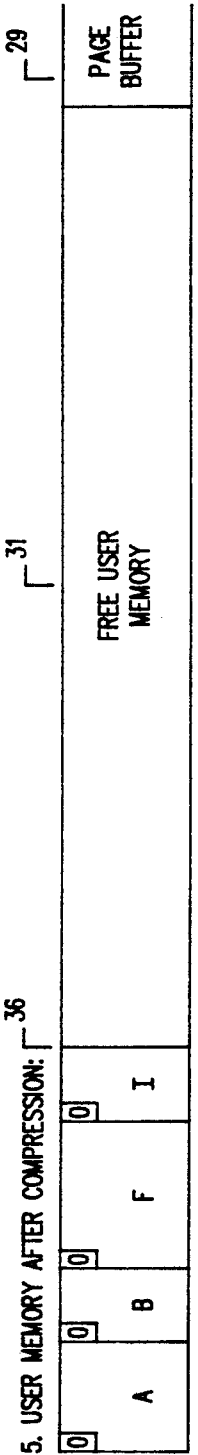

PAGE PRINTER MEMORY ALLOCATION

DESCRIPTION OF THE INVENTION

1. Field of the Invention

This invention relates generally to page printers and more particularly concerns the allocation of memory in such printers among various memory uses.

The invention is disclosed particularly in relation to an electrophotographic laser printer in which a memory allocation arrangement is used to allocate memory among bit map memory, a page buffer, and user memory.

2. Description of the Prior Art

In order to minimize system memory, and therefore cost, most manufacturers of page printers make a tradeoff in the allocation of memory between memory for user features and memory available for page bit mapping. More memory for user features permits a user to have greater numbers of download fonts and macros, for example. Greater memory for bit maps enhances complex page performance.

Increasing the number of user features requires a reduction in complex page performance, while increasing complex page performance forces the number of user features to be reduced.

As mentioned, one feature of most page printers is the ability to download custom fonts and macros into the printer's memory. Another feature of page printers is the ability to print graphics, or all points addressable (APA) data. However, APA data requires a large amount of memory and therefore dramatically reduces the size of memory available for other uses.

Converting datastream commands to a printed page is a three-stage process. First, data from the host connection is manipulated and saved in an area of printer memory known as the page buffer. Second, the contents of the page buffer are rasterized into the image of the page to be printed and stored in either a partial page or a full page bit map memory. Third, the data from the bit map memory is serialized and sent to the print engine for printing. In a laser printer, for example, the data from the bit map is used to modulate the laser as the laser beam is swept across a photoconductor.

One approach to maintaining a relatively low cost for a basic page printer, while permitting enhanced user features, if desired, is to provide a basic page printer with a certain amount of memory and to permit the addition of memory, such as through the use of plug-in memory cards, at an additional cost. Such memory cards typically increase the amount of user memory available for downloading fonts and macros. In the absence of download fonts and macros to utilize the additional memory, this memory often remains idle.

It is the general aim of the invention to provide a technique for making better use of free memory in page printers of the foregoing type.

SUMMARY OF THE INVENTION

In carrying out the invention, a memory management system is provided for a page printer controller which includes random access memory allocated between bit map memory and memory for other uses. The memory management arrangement provides for the allocation of the random access memory to provide a large bit map memory. The memory management arrangement also has the ability to be responsive to needs of the printer controller for increased memory for other uses by reallocating the random access memory to reduce the size of the bit map memory, if required. The memory freed from the bit map is then available to be used for other purposes.

Other objects and advantages of the invention will become apparent upon reading the following Detailed Description and upon reference to the drawings, in which:

BRIEF DESCRIPTION OF THE FIGURES

FIG. 8 is a flowchart of a subroutine used in the routine of FIG. 6;

FIGS. 9a-9d provide a diagrammatic illustration of the deletion of memory from user memory;

DETAILED DESCRIPTION

Figure 1:
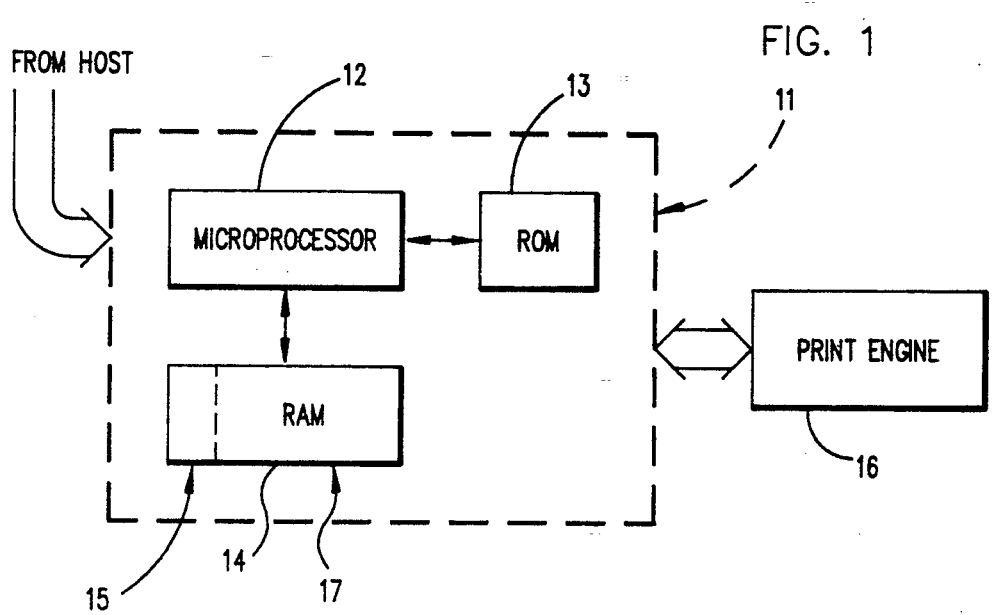
FIG. 1 is a schematic block diagram of a page printer engine and controller embodying the present invention.

While the invention is susceptible to various modifications and alternative forms, a specific embodiment thereof has been shown by way of example in the drawings and will herein be described in detail. It should be understood that it is not intended to limit the invention to the particular form disclosed. The intention is to cover all modifications, equivalents and alternatives falling within the spirit and scope of the invention as defined by the appended claims.

With initial reference to FIG. 1, a laser page printer includes a printer controller 11 containing a microprocessor 12 and associated read only memory (ROM) 13 and random access memory (RAM) 14. In the present printer, the microprocessor 12 is a Motorola 68000 microprocessor. The ROM 13 contains the instructions executed by the microprocessor 12 to cooperate with the balance of the controller 11 to control the print engine 16 of the page printer in response to commands and data received from a host computer. The print engine 16 is the non-controller portion of the page printer, including, in the present instance, a laser printhead driven by the controller 11, a photoconductor, developer material, a drive motor, and so on.

The RAM 14 in the controller 11 contains system memory 15, as well as user memory, a page buffer, and bit map memory, all of which are collectively designated 17 in the Figure. The RAM 14, in the exemplary printer described herein, is 2.5 megabytes, two megabytes of which may be provided on a memory expansion card (not shown). The system memory 15 is a portion of the available memory which is utilized by the microprocessor 12 for system pointers, buffers and other storage. In the subsequent description and accompanying illustrations of allocation of random access memory, only the non-system portion 17 of the RAM 14 will be discussed as the random access memory in the controller 11 (except for incidental reference to pointers which reside in the system memory).

The page printer controller 11 produces an image (called a bit map) of a page in the RAM memory 17 into which the data to be printed is rasterized and out of which the bits to be printed are serialized. A large amount of memory is required to hold an image of an entire page at one time. In order to reduce memory costs, most lower cost page printers hold only a portion of a page at one time, rasterizing into this portion in real time while serializing data to the printhead. A complex page error occurs when the controller 11 cannot complete the necessary rasterization by the time the bit data is needed to be serialized to the printhead.

In the illustrated page printer, the bit map memory is divided into two swaths. Data is serialized out of one swath while the next data to be printed is rasterized into the other swath. Both processes must occur in real time while the paper to receive the image from the photoconductor is moving continuously through the printer. The larger the swaths, the fewer the passes that must be made in rasterizing the page information held in the page buffer and the more complex the page that can be processed without a complex page error occurring. When the swaths are enlarged enough to cover a full page, the entire page can be rasterized before starting the paper moving past the print point and complex page errors can be eliminated.

The page buffer memory is used to hold the description of the page in the format used for rasterizing. For example, in the present instance, text is stored in the page buffer as alphanumeric characters, while corresponding bit map images for each of the characters are stored in the user memory or in ROM. When the text is rasterized into the bit map memory, the bit image for each character is written into the proper location in the bit map memory. If a page description should overflow the page buffer, the page buffer must be emptied before the rest of the page can be received and placed into the buffer. If a full page bit map is available, the page can be rasterized into the bit map, freeing up page buffer space from the page description, which process can continue until an arbitrarily large page is completely processed without error. If the bit map is smaller than a full page size, the partial page is printed, and a partial page error occurs.

User memory is usually allocated out of the page buffer memory. Existing printers, for example, use optional memory cards to provide more memory in the form of page buffer memory, download font space, and macro space. With dynamic memory allocation, in accordance with the present invention, the illustrated page printer is as efficient as existing printers at providing user memory when memory is enlarged, such as by the addition of optional memory cards, while still providing partial page and complex page benefits in many cases. In the present printer, when additional user memory is required, and the optional memory is being used in the bit map, the bit map memory is reduced in size and the freed memory is allocated to user memory. Should the user memory be freed, such as by deleting a download font, the freed memory is returned to the bit map memory. In essence, when the user does not require a large amount of memory, the printer puts it to use in the bit map, reducing complex and partial page errors and making rasterizing more efficient.

In the illustrated controller 11, the RAM 17 is divided among bit map, page buffer and user memory. The bit map memory can be in a large size or a small size. In the large bit map configuration, enough memory is allocated to the bit map to contain the data for an entire page. In the small bit map configuration, the bit map contains enough memory to print a small section of a page. This small memory section is reused multiple times in order to print an entire page. In practice, the large bit map memory contains two seven-inch swaths, so that an entire 14-inch page can be rasterized into the bit map memory. The small bit map memory contains two swaths, each of which can hold the raster data for about six-tenths of an inch of the page.

When the total amount of system memory is large enough to allow it, a large bit map memory area is allocated. This guarantees that any page, regardless of its complexity, can be printed. Initially, the page buffer is allocated the remaining printer memory, while initially the user memory has no memory allocated. When the datastream to the printer contains a command that requires user memory, that amount of memory is removed from the page buffer allocation and allocated to the user memory area. Each required quantity of memory allocated or reallocated shall be referred to herein as a block of memory. The structure of a memory block shall be discussed in more detail subsequently.

If the datastream to the printer contains a request for memory of such a size that the page buffer would be reduced below a minimum size, one of two outcomes is possible. If the printer has a large bit map, the bit map is reduced to its small size. The memory freed from the bit map is allocated to the page buffer and a required memory block is obtained by reducing the page buffer allocation by the amount needed for user memory. On the other hand, if the bit map memory is already at its small size, a memory full indication is provided to the user. The requested user function cannot be performed, and it is ignored. A minimum size for the page buffer is maintained in order to insure that at least the largest datastream command can be processed to the page buffer.

When a user function executed by the microprocessor 12 no longer needs a memory block, it can request that the controller delete the block. In response to the request, the microprocessor executes a memory manager routine to free the memory that was in the deleted block and to return it to the page buffer or to available user memory. If the page buffer at some time becomes larger than a selected maximum size, and the bit map is in its small size, the extra memory is added to the bit map, returning the bit map to its large size, allowing the printing of a page of unlimited complexity.

Figure 2A:
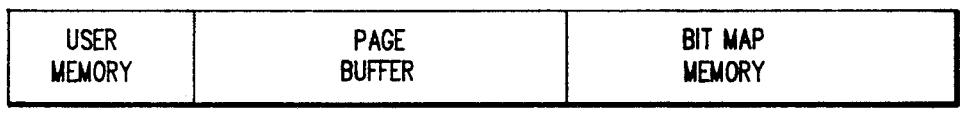
FIGS. 2a-2c illustrate diagrammatically the allocation of memory to increase user memory.
Figure 2B:
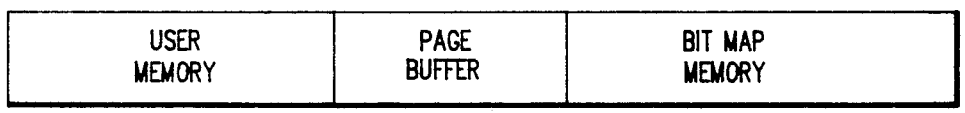

The allocation of memory blocks is shown schematically in FIGS. 2 and 3. In an arbitrary memory allocation, shown in FIG. 2a, user memory and page buffer memory have a certain size, and the bit map memory is in its large size. As requests for user memory are processed, blocks of memory are placed one after the other in front of the page buffer and the page buffer is reduced in size from the top (the left as shown in FIG. 2b). When a request for user memory is received that would reduce the size of the page buffer below a preset minimum size, the bit map memory is reduced in size and the freed memory is given to the page buffer. As shown in FIG.

2c, the requested memory block is then removed from the now-enlarged page buffer and added to the user memory.

Figure 2C:
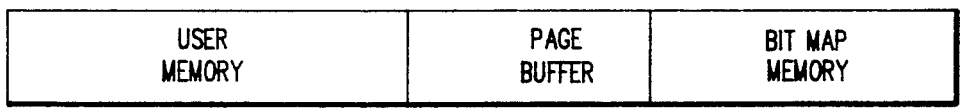
Figure 3A:
FIGS. 3a-3b illustrate diagrammatically the allocation of memory from user memory and page buffer memory to bit map memory.
Figure 3B:
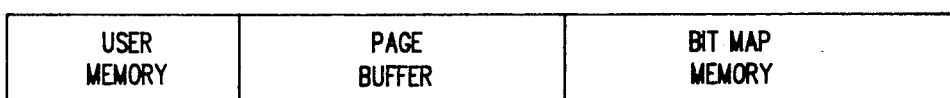

The de-allocation of memory blocks from user memory is shown in FIG. 3. As a memory block is no longer needed, the routine that was using the memory block requests the memory manager software to delete it. The memory manager, starting with a memory allocation as shown in FIG. 2c, for example, deletes user memory to expand the page buffer as shown in FIG. 3a. If the size of the page buffer reaches a preset maximum size, the bit map memory is returned to its large size, and the size of the page buffer is reduced, as shown in FIG. 3b. There is hysteresis built into this aspect of the memory manager software so that it is not continuously switching between small and large bit map allocations.

Figure 4:
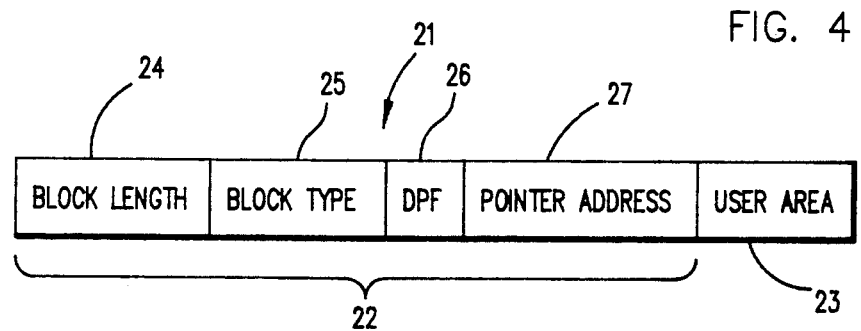
FIG. 4 illustrates diagrammatically the contents of a memory block.

Considering the structure of a memory block in more detail, and with reference to FIG. 4, a typical memory block 21 includes a block header 22 and a user area 23. In the present instance, the block header is 8 bytes in length and contains information used by the memory manager software for doing block movement or removal.

In the illustrated block header 22, the block length field 24 is 3 bytes long and indicates the length of the block, including the header. The block length information is used by the memory manager software to locate the next block.

The block type field 25 is 4 bits in length. The memory blocks may be substantially regarded as either static pointer blocks or dynamic pointer blocks. The block type field indicates whether the block is a static pointer block or a dynamic pointer block. Static pointer blocks are accessed by pointers that are in static (non-moveable) system memory. Dynamic pointer blocks are accessed by pointers that are themselves contained in a memory manager allocated block. Due to this difference, dynamic pointer blocks must be processed differently from static pointer blocks, necessitating the block type field in the block header 22.

The delete pending flag (DPF) block 26 is a single bit. Due to the architecture of the present printer, it is not desirable to move memory while a page is being printed. Therefore, when a block is to be deleted from user memory, this bit 26 is set (to a logic one in the present instance) in the block's header, indicating that it is to be removed as soon as allowable.

The pointer address field 27 is 4 bytes in length and is the absolute address of the requesting function's pointer to this block. When the block is moved, the requesting function's pointer is updated to point to the block's new location.

The user area 23 is the space where the requesting function stores its data. The user area 23 may be considerably longer than the header 22, depending upon the amount of data to be stored in the memory block 21. The pointer to the block contains the address of the first byte of the user area.

Figure 5:
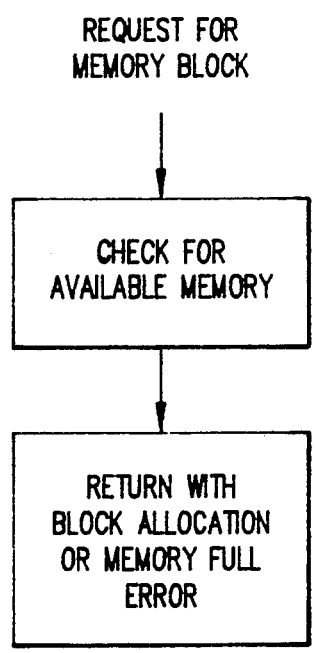
FIG. 5 is a high level flowchart of the process for allocating memory to user memory.

Considering the allocation of memory to provide a memory block in user memory in more detail, and with reference to FIG. 5, when a request for a memory block is received (such as, for example, from a font download or a macro download routine), the available memory is checked to see if the request can be honored. As shown in FIG. 5, if the request can be honored, a memory block is allocated to the requesting routine and the microprocessor returns to the routine. If the request cannot be honored, a "memory full" indication is produced.

Figure 6:
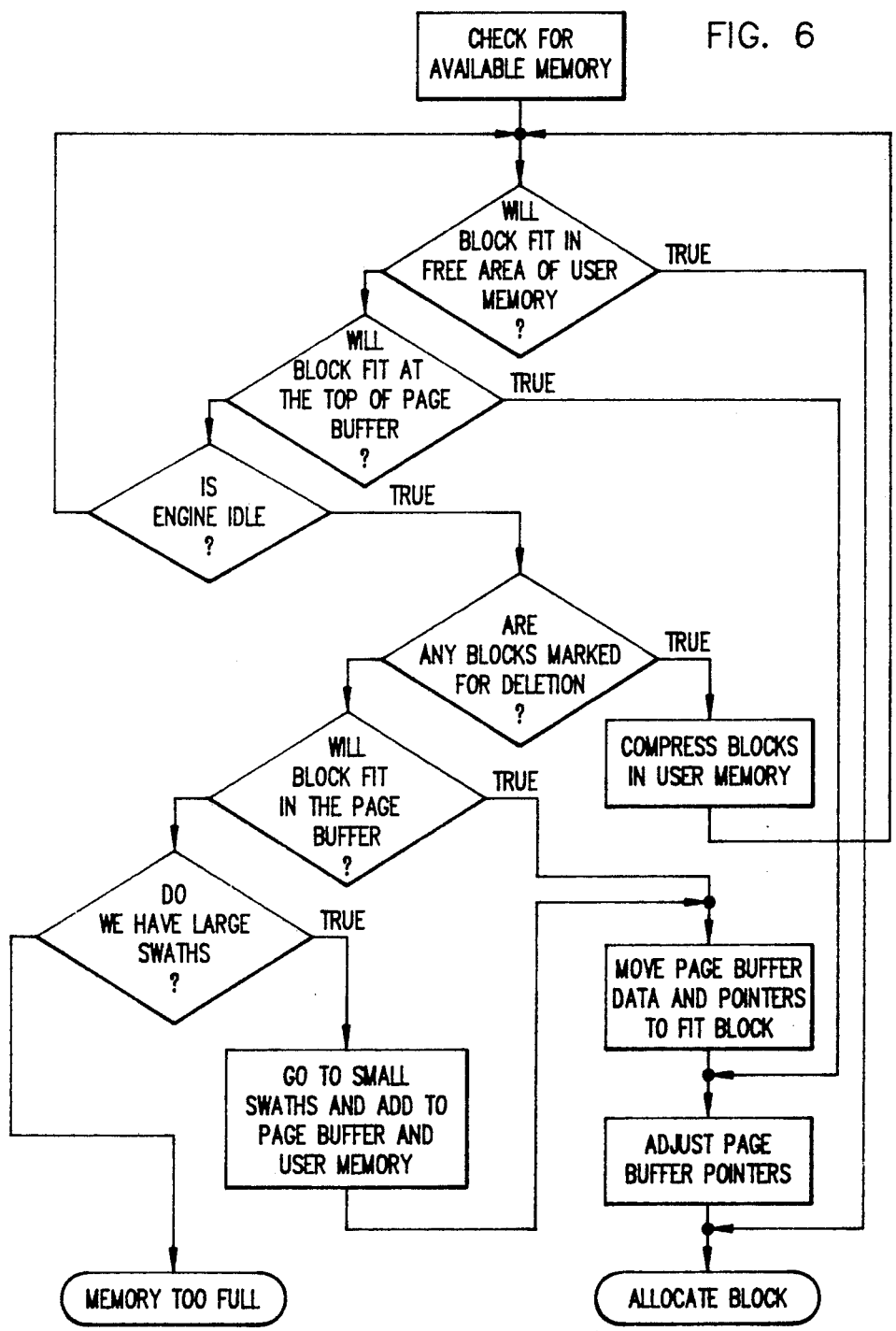
FIG. 6 is a more detailed flowchart of a routine implementing the operation illustrated in FIG. 5.

The routine in the memory manager software for checking for available memory is set forth in the flowchart of FIG. 6. This "check for available memory" routine has access to the information provided by a routine calling for a block of memory. This information includes the size of the memory block needed and the address of the pointer which will direct the calling routine to this memory block.

The "check for available memory" routine first determines if the requested block of memory will fit in a free area of user memory. If so, a block is allocated from the free area of user memory. The block header information is placed in the block, including the pointer address, and the block address is returned for use by the requesting function.

Figure 7:
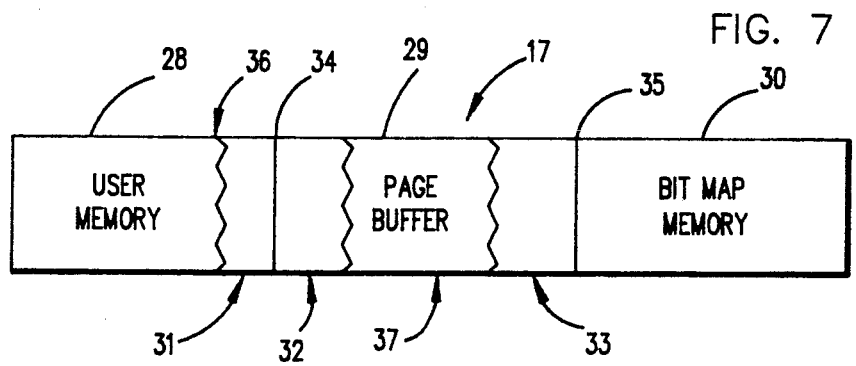
FIG. 7 illustrates diagrammatically used and unused areas of a user memory and page buffer.

To facilitate an understanding of the flow chart of FIG. 6 and subsequent flow charts, FIG. 7 shows used and unused areas of the user memory 28 and page buffer 29 in an exemplary configuration of RAM 17. FIG. 7 also shows a bit map memory portion 30 of the RAM 17. In FIG. 7, an unused portion 31 of the user memory 28 is available for use (in whole or in part) as a memory block. The unused portion 31 of the user memory 28 lies between the end 36 of "used" user memory and the top 34 of the page buffer 29. Pointers are maintained in the system memory to the "end of user memory" 36 and to the top 34 of the page buffer. When a memory block is allocated, the pointer to the end of user memory 36 is adjusted by the size of the allocated block.

Returning to the "check for memory" routine, if the requested block will not fit in a free area of user memory, the routine next determines if the block will fit in unused memory at the top of the page buffer area. As shown in FIG. 7, this unused memory area 32 is between the top 34 of the page buffer 29 and the beginning of page buffer data 37 which is needed by the controller for pages not yet fully rasterized and printed. If the requested memory block will fit within the free area 31 of user memory 28, added to some or all of the unused page buffer area 32, then the routine changes the pointer (in system memory) to the top 34 of the page buffer to move the top of the page buffer (to the right as shown in FIG. 7). The top of the page buffer is moved the necessary amount to expand the user memory so that the requested memory block can be allocated from user memory.

Returning to FIG. 6, if the requested block will not fit in unused page buffer memory at the top of the page buffer, the routine next determines if the print engine is idle. In order not to disturb memory during printing, with resultant printing errors, memory is not moved when the print engine is running. Also while the print engine is running, the size of the bit map memory is not adjusted. Therefore, the routine loops back to the beginning, waiting for the print engine to become idle or sufficient user or page buffer memory to become free.

When the print engine is idle, the routine next determines if any blocks of user memory have been marked for deletion. To do this, the status of a "delete pending" indicator, or flag, is checked. If any blocks in user memory have been marked for deletion, this "delete pending" indicator is set. If there are memory blocks to delete, the blocks which are not deleted are compressed at the top of the user memory.

In order to compress blocks in user memory, the subroutine of FIG. 8 is executed. In this subroutine, the first one or more contiguous blocks marked for deletion are deleted. To do this, the subroutine finds the first block in user memory that is marked for deletion. An exemplary user memory containing memory blocks lettered A through I is shown in FIG. 9a. The delete pending flags are shown for each of the blocks, with a "1" indicating that the block is to be deleted.

The subroutine of FIG. 8 loops through this step until reaching the end of user memory.

Assuming initially that there are blocks to be deleted from the user memory and the end of the user memory has not yet been reached, the subroutine combines all contiguous blocks for deletion into one block. This is illustrated in FIG. 9b, in which blocks C, D and E have been combined into a single block to be deleted. The subroutine stops combining blocks at that point since memory block F has not been marked for deletion.

If this combined C, D and E block is not the last user block, which is the case as shown in FIG. 9b, the subroutine then adjusts all pointers to blocks in user memory which will be moved when block CDE is deleted. The pointers are adjusted by the size of the CDE block which is to be deleted. The pointers to be adjusted may be in fixed locations in system memory or in memory blocks in the user memory area. The pointer locations are found in the headers of the blocks being moved. Next the contents of the user area are moved (to the left as shown in FIG. 9) by the size of the deleted block. This transition is shown in the change from the memory allocation in FIG. 9b to that of FIG. 9c. In FIG. 9c, the blocks C, D and E have been deleted, and blocks F through I moved to the left so that the block F is adjacent to the block B. The block movement is accomplished by rewriting the block data for the blocks F through I beginning at the end of the block B.

A pointer in system memory pointing to the end 36 of user memory is then adjusted by the size of the deleted block so that the free area 31 of user memory 28 (FIG. 7) is expanded.

The subroutine of FIG. 8 executes in a loop until reaching the end of the user memory. If, after the step of combining all contiguous blocks marked for deletion into one block, the subroutine determines that the block which is now being deleted is the last user block, instead of adjusting pointers and moving memory contents, the subroutine merely adjusts the pointer to the end 36 of user memory, since there is no undeleted memory to be moved below the block being deleted.

Once the subroutine of FIG. 8 reaches the end of user memory, the subroutine clears the delete pending indicator and returns. The result of the execution of the subroutine is to reduce the allocated user memory to memory blocks not marked for deletion, such as the exemplary memory blocks shown in FIG. 9d, and to adjust the pointer to the end 36 of user memory to indicate that free user memory 31 has been expanded.

Returning to the routine of FIG. 6, after all undeleted blocks have been compressed in user memory, the routine is re-executed to now determine if the requested memory block will fit in the free area of user memory. This may now be the case since the area 31 was expanded or created by the routine of FIG. 6. Additionally, (in the "will block fit at the top of page buffer" decision and in the "adjust page buffer pointers" step) the unused page buffer area 32 may be added to the free area of user memory 31 in an attempt to satisfy the request for memory.

Returning to the determination in the routine of FIG. 6 of whether any blocks are marked for deletion, if no blocks in the user memory are marked for deletion, the routine next determines if the requested block is of such a size that it would fit in unused page buffer memory, including the unused portion 33 (FIG. 7) below the page buffer data still needed for unprinted pages. If so, the subroutine of FIG. 10 is executed.

Figure 10:
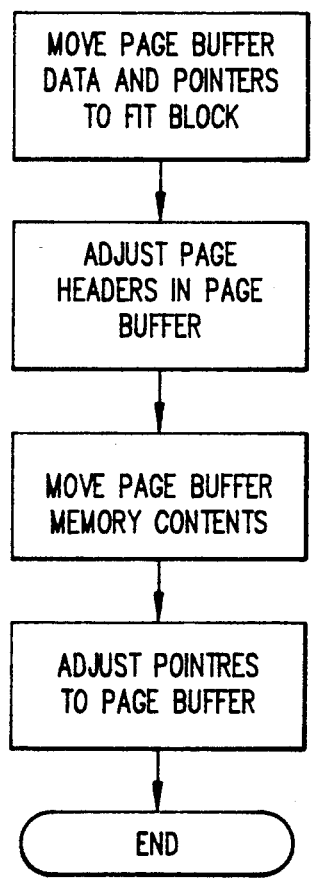
FIG. 10 is a flowchart of a second subroutine used in the routine of FIG. 6.

Considering the movement of the page buffer to allocate a memory block in more detail, and with reference to FIG. 7 as well as FIG. 10, in order to move the page buffer, first the page headers in the page buffer are adjusted. More than one page may be stored in the page buffer, and each page has a header including a pointer to the next page. These pointers are adjusted by the amount that the page buffer data must be shifted in the page buffer memory to provide enough memory for the requested block.

After the page headers are adjusted, the page buffer memory contents 37 are rewritten to a lower portion (to the right as shown in FIG. 7) of the page buffer memory. Then the pointers to the page buffer in system memory are adjusted for the amount of the offset of the page buffer contents.

The top of page buffer boundary 34 is moved to expand the user memory by the necessary amount, and the requested block of memory is allocated from the now-expanded user memory.

Returning to FIG. 6, if it is determined that the block will not fit in unused areas of the user memory and of the page buffer, the routine of FIG. 6 then determines if the bit map memory is in its large swath configuration. If not, a memory full error is produced and the routine returns. If the bit map memory is in the large swath orientation, the routine changes the bit map memory to small swath sizes and adds the freed memory to the page buffer. This is illustrated diagrammatically in the change in bit map memory size from FIG. 2b to FIG. 2c. The page buffer data is then moved, as described earlier with regard to FIG. 10, to permit placement of the requested block in user memory.

Figure 11:
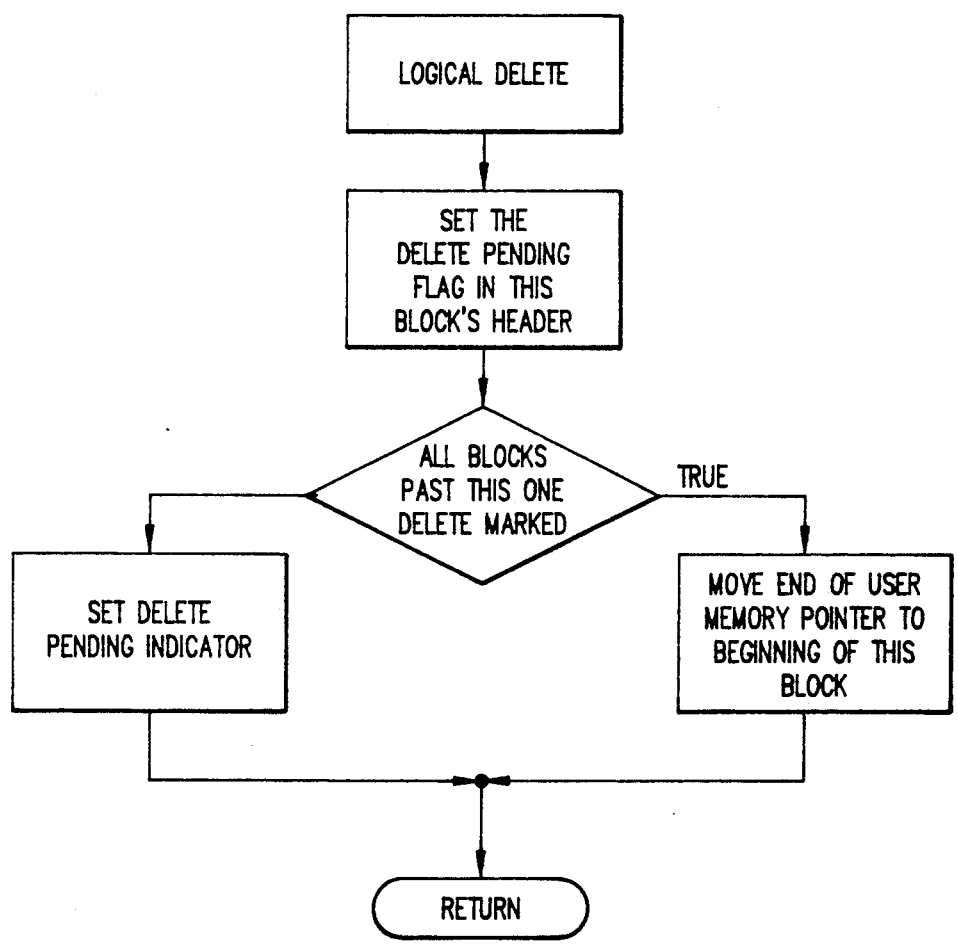
FIG. 11 is a flowchart of a routine for logically deleting memory from the user memory.

As a memory block is no longer needed, the function using the memory block requests the memory manager software to delete the block. In response to such a request, the memory manager software executes a routine to set the delete pending flag (DPF) of the block (FIG. 11). The memory manager software in this routine first sets the delete pending flag in the block's header. The routine next checks to see if all blocks past the one marked for deletion are also marked for deletion.

If so, the end of user memory pointer is moved to the beginning of this block. This permits the "quick deletion" of memory, which can occur even if the print engine is not idle. The top 34 of the page buffer is not moved at this time. Instead, the free user memory area 31 (FIG. 7) is expanded or created.

If all blocks past the one marked for deletion are not also marked for deletion, the delete pending indicator is set.

Figure 12:
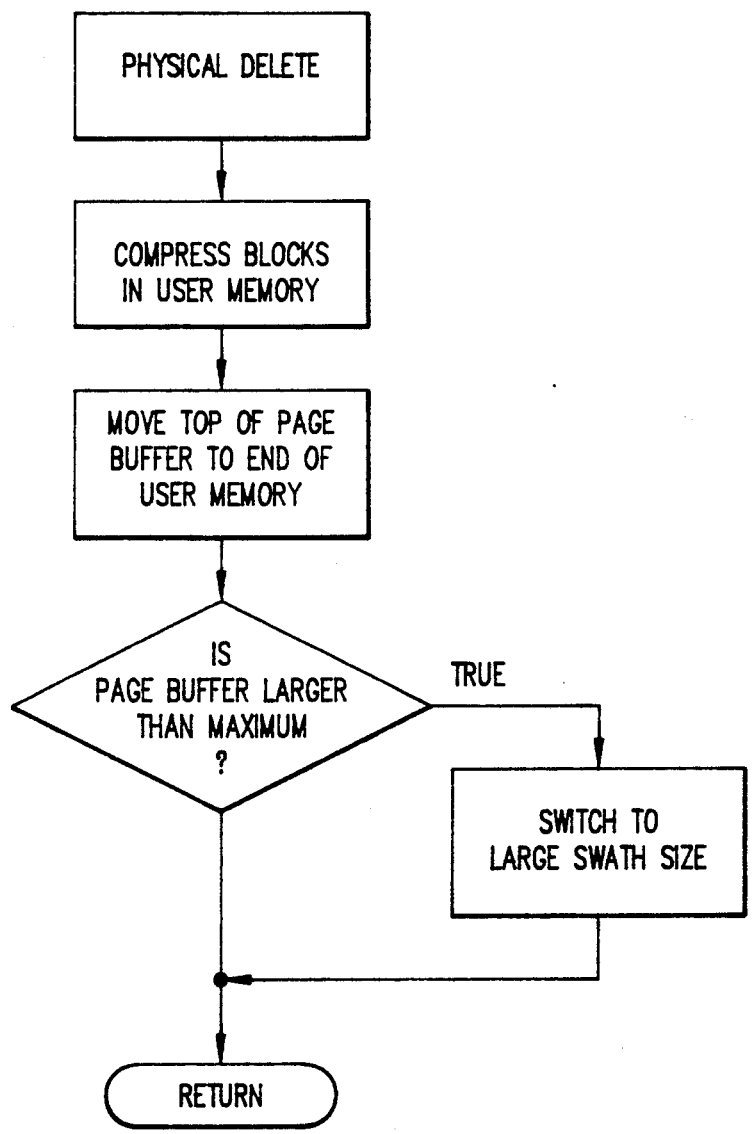
FIG. 12 is a flowchart of a routine for physically deleting memory from the user memory.

If a delete request is for an actual deletion of memory, implying that the print engine is idle, rather than merely for a logical deletion, the memory manager software executes the routine of FIG. 12. This routine is typically called when the controller is idle. In executing the routine of FIG. 12, first the user memory is compressed using the subroutine of FIG. 8. The top of the page buffer is then moved to the end of user memory.

The routine then checks to see if the page buffer is larger than a predetermined maximum amount and if the bit map memory is in its small size. The routine at this time also determines if the amount of additional memory needed to change from the small bit map size to the large bit map size is present in unused areas 32,33 (FIG. 7) of the page buffer. If these conditions are not all true, the routine returns.

If all of the conditions are true, the routine changes the bit map memory from its small size to its large size. In making this change, should the unused area 33 of the page buffer be insufficient to accommodate the large bit map memory size, the page buffer information 37 is moved as necessary into the unused page buffer area 32, increasing the area 33. The routine then returns.

While the invention has been disclosed in terms of changing the bit map memory between two sizes, it will be understood that it is also applicable to varying the bit map memory among three or more sizes.

What is claimed is:

1. A page printer comprising a print engine and a printer controller, responsive to data and commands from a host computer, having (a) a processor operating under program instruction control and (b) a random access memory utilized by the processor, the random access memory having (a) a system memory portion and (b) a non-system memory portion divided among user memory, page buffer memory and bit map memory where the page buffer memory has a boundary with the user memory and a boundary with the bit map memory, and the bit map memory has a full page bit map size and a smaller partial page bit map size, in which the processor operating under program control includes:

(a) means for allocating a block of memory in the user memory for data from the host computer comprising, (1) means for allocating a block of user memory for the data if there is adequate free user memory; and (2) means for (i) moving the boundary between the user memory and the page buffer memory to enlarge the user memory, by reallocating unused page buffer memory, if there is sufficient unused page buffer memory adjacent the boundary to create adequate free user memory to allocate a block of user memory for the data and (ii) allocating a block of user memory for the data, (b) means, operable when the print engine is idle, for freeing user memory and page buffer memory adjacent the boundary between the user memory and the page buffer memory comprising, (i) means for deleting unneeded blocks of user memory and moving the remaining blocks adjacent one another away from the boundary between the user memory and the page buffer memory, and (ii) means for moving blocks of page buffer memory away from the boundary between the user memory and the page buffer memory to the boundary between the page buffer memory and the bit map memory, and (c) means, operable when the print engine is idle and the bit map memory has its full page bit map size, for moving the boundary between the page buffer memory and the bit map memory to enlarge the page buffer memory, by reducing the bit map memory from its full page bit map size to its partial page bit map size, when there is data to be placed in the user memory and there is inadequate free user memory and unused page buffer memory for the data.

* * * * *